(12) United States Patent
Buchschacher et al.

(10) Patent No.: US 12,483,294 B2
(45) Date of Patent: Nov. 25, 2025

(54) SIGNAL TRANSMISSION SYSTEM

(71) Applicant: Endress+Hauser Flowtec AG, Reinach (CH)

(72) Inventors: Pascal Buchschacher, Döttingen (CH); Alex Huber, Bülach (CH); Hanspeter Schmid, Küttigen (CH); Werner Tanner, Lausen (CH)

(73) Assignee: Endress+Hauser Flowtec AG, Reinach (CH)

( * ) Notice: Subject to any disclaimer, the term of this patent is extended or adjusted under 35 U.S.C. 154(b) by 57 days.

(21) Appl. No.: 18/722,051

(22) PCT Filed: Dec. 2, 2022

(86) PCT No.: PCT/EP2022/084226
§ 371 (c)(1),
(2) Date: Jun. 20, 2024

(87) PCT Pub. No.: WO2023/117373
PCT Pub. Date: Jun. 29, 2023

(65) Prior Publication Data
US 2025/0060767 A1 Feb. 20, 2025

(30) Foreign Application Priority Data
Dec. 20, 2021 (DE) .................... 10 2021 133 933.2

(51) Int. Cl.
*H04B 3/50* (2006.01)
*G05F 1/46* (2006.01)
*H03K 3/037* (2006.01)

(52) U.S. Cl.
CPC .............. *H04B 3/50* (2013.01); *G05F 1/46* (2013.01); *H03K 3/037* (2013.01)

(58) Field of Classification Search
CPC ...................................................... H04B 3/50
See application file for complete search history.

(56) References Cited

U.S. PATENT DOCUMENTS 6,281,715 B1 * 8/2001 DeClue .......... H03K 19/018528
327/108
6,288,581 B1 * 9/2001 Wong ................... H03K 5/2481
327/321

(Continued)

FOREIGN PATENT DOCUMENTS

| CN | 104135272 A | 11/2014 |
| DE | 102004059444 A1 | 6/2006 |
| DE | 102017200687 A1 | 7/2018 |

OTHER PUBLICATIONS

Matig-A, et al., Design of a CML Transceiver With Self-Immunity to EMI in 0.18 μm CMOS, IEEE Transactions on Circuits and Systems—I: Regular Papers, vol. 64, No. 4, Apr. 2017, pp. 981-991.

*Primary Examiner* — Patrick O Neill
(74) *Attorney, Agent, or Firm* — Mark A. Logan; Endress+Hauser (USA) Holding, Inc.

(57) ABSTRACT

The signal transmission system comprises a transmitter circuit, a receiver circuit and a signal cable. A current divider is formed by a terminating resistor between the signal conductors of the signal cable. The transmitter circuit drives a loop current. When the receiver circuit input voltage has a voltage level above a first switching voltage threshold value, the output voltage assumes a first voltage level. The output voltage maintains the first voltage level when the input voltage is below the first switching voltage threshold value but above a second switching voltage threshold value. The transmitter circuit is configured to modulate the loop current with at least two different non-zero magnitudes at successive times. The first magnitude is greater than a first switching current threshold value and the second magnitude is less than the first switching current threshold value and greater than a second switching current threshold value.

18 Claims, 3 Drawing Sheets

(56) References Cited

U.S. PATENT DOCUMENTS

| | | |
|---|---|---|
| 7,109,743 B2 | 9/2006 | Shumarayev et al. |
| 2019/0107425 A1 | 4/2019 | Welle et al. |
| 2019/0129452 A1 | 5/2019 | Hirata et al. |

* cited by examiner

SIGNAL TRANSMISSION SYSTEM

CROSS-REFERENCE TO RELATED APPLICATIONS

The present application is related to and claims the priority benefit of DPMA Patent Application No. 10 2021 133 933.2, filed on Dec. 20, 2021, and International Patent Application No. PCT/EP2022/084226, filed Dec. 2, 2022, the entire contents of which are incorporated herein by reference.

TECHNICAL FIELD

The invention relates to a signal transmission system for (possibly fast and preferably energy-saving), possibly also ANSI/TIA/EIA-644-1995 (LVDS) compliant, digital signal transmission.

BACKGROUND

Differential voltage levels are also used in industrial measurement and automation technology for the fast transmission of digital (measurement and/or operating) data at bit rates of more than 500 kbit/s (kilobits per second), in particular also signal transmission systems conforming to the ANSI/TIA/EIA-644-1995 standard (LVDS—Low Voltage Differential Signaling) are used, for example to serially transmit digital (useful) data, such as measurement and/or operating data, within a (stand-alone) measuring apparatus or measuring system formed by means of at least one sensor and electrically connected transducer electronics. Such a signal transmission system is shown, for example, in U.S. Pat. Nos. 6,281,715 B, 6,288,581 B, US-A 2004/0124888, US-A 2009/0045852, US-A 2015/0247747, US-A 2016/0290847, US-A 2018/0328774 or US-A 2019/0107425.

Such a signal transmission system conforming to the ANSI/TIA/EIA-644-1995 standard or suitable for LVDS transmission comprises a transmitter circuit, sometimes also referred to as an LVDS driver, with a signal input and a signal output, and a receiver circuit with a signal input—typically having an input resistance of more than 1 MΩ (MegaOhm)—and with a signal output. The transmitter circuit and the receiver circuit are also electrically connected by means of a pair of signal conductors, usually of the same type and/or having identical electrical properties, wherein said signal conductors are also electrically connected together at a receiver circuit-side (respective) line end via a terminating resistor—typically having more than 20Ω (Ohm) and less than 1 kΩ (MegaOhm), for example approximately 100Ω, and wherein the signal output of the transmitter circuit and the signal input of the receiver circuit are electrically connected to one another by means of the pair of signal conductors; this in particular in such a manner that a current loop involving the signal output of the transmitter circuit, the pair of signal conductors and a current divider formed by means of the terminating resistor and the signal input of the receiver circuit is formed. In addition, the transmitter circuit of such a signal transmission system is configured to drive a (loop) current with a predeterminable (signal) current strength, typically between 3 mA (milliamperes) and 10 mA, and a predeterminable (signal) current direction in the current loop, which may also be adjusted, in such a manner that a (signal) voltage—serving here as an input voltage of the receiver circuit—drops across the terminating resistor with a voltage level proportional to the (signal) current strength of the (loop) current and with a polarity dependent on the current direction of the (loop) current, and the transmitter circuit is configured to modulate a binary or digital input signal applied to its signal input, for example also with a unipolar voltage, onto the (loop) current; for example, in such a manner that the transmitter circuit drives the (loop) current with a predeterminable or alternating current direction in the current loop, wherein the (loop) current has a first current direction in the case of an input signal having a first signal state (HIGH→1) and that the (loop) current has a second current direction opposite to the first current direction in the case of an input signal having a second signal state (LOW→0) different from the first signal state. Furthermore, the receiver circuit is configured to convert an input voltage, namely a (signal) voltage at the signal input of the receiver circuit, into a corresponding output voltage, namely a (signal) voltage at the signal output of the receiver circuit, in such a manner, that the output voltage of the receiver circuit (only) assumes or has a non-zero first voltage level in the case of a (positive) input voltage with a voltage level exceeding a (non-zero positive) first switching voltage threshold value or lying above the said first switching voltage threshold value. In the signal transmission systems shown in U.S. Pat. Nos. 6,281,715 B, 6,288,581 B, US-A 2004/0124888 or US-A 2009/0045852, the respective receiver circuit is also configured to convert the above-mentioned input voltage into the output voltage, that the latter (only) assumes or has assumed a second voltage level which differs from the first voltage level of the output voltage, is zero or possibly also different from zero (NRZ, NRZI), in the case of a (negative) input voltage with a voltage level which is below a second switching voltage threshold value (different from the first switching voltage threshold value as well as different from zero) or lies below the said second switching voltage threshold value.

The digital input signal to be transmitted by means of the signal transmission system can, for example, be a UART (Universal Asynchronous Receiver Transmitter) compliant digital signal, i.e., such a digital signal, with which the actual (measurement and/or operating) data is transmitted as a serial digital data stream with a fixed frame (corresponding to a fixed number of transmitted bits), which typically consists of a start bit, (depending on the protocol) five to a maximum of nine (useful) data bits, an optional parity bit for detecting transmission errors and one or two stop bits. Data transmission can therefore be asynchronous or byte-synchronous, for example. The (signal) quality of the (signal) voltage across the respective terminating resistor that can be achieved by means of signal transmission systems of this type with a specified transmission rate for a given (transmission) length of the signal conductor is determined not only by the electrical properties, such as in particular impedance or attenuation, of the signal conductor or the (signal) cable formed with it, but also by the current of the (loop) current or the electrical (transmission) power that can be fed into the signal conductor by means of the transmission circuit.

The transmitter circuits of the signal transmission systems shown in U.S. Pat. No. 6,281,715 B, 6,288,581 B, US-A 2004/0124888 and US-A 2009/0045852 are further configured to compensate for influences of the signal conductors or the cable formed therewith that impair the aforementioned transmission rate of the signal transmission system or the aforementioned signal quality of the (signal) voltage, during a so-called pre-emphasis (phase) at the beginning of each (LVDS) clock cycle of the transmitter circuit, which is (re)started by a signal edge (corresponding to a signal state change HIGH→LOW or LOW→HIGH) of the digital input signal, briefly reduces the (loop) current, for example, for approximately 10% to 15% of the respective (LVDS) clock cycle or a (nominal) bit duration corresponding to a reciprocal of the respective (nominal) bit rate, for example 2 μs/bit at a bit rate of 500 kbit/s, with an overcurrent, namely an increased current compared to the (signal) current set for the remaining clock time. The configuration of such a pre-emphasis (phase) also makes it possible, among other things, to establish a longer (signal) transmission distance of more than 10 m (meters) between the signal output of the transmitter circuit and the signal input of the receiver circuit using a signal cable formed by means of the signal conductor pair, for example a balanced signal cable or a shielded (twisted pair) signal cable suitable for balanced signal transmission. However, the electrical power available for the operation of such a signal transmission system, not least when used in a measuring apparatus for industrial measurement and automation technology, which regularly requires the aforementioned high transmission rates of no less than 500 kBits/s, i.e., low bit durations of no more than 2 μs (microseconds), cannot be exceeded, for example, a (two-wire) measuring apparatus with at least temporarily low power consumption of less than 50 mW (milliWatt) or a measuring apparatus in accordance with US-A 2018/0328774, can be limited or contingent to a considerable extent; this can also be done, for example, in such a manner that the (loop) current can only be permanently set with currents of less than 10 mA, possibly also of less than 5 mA at least temporarily, or a corresponding (transmission) power of less than 10 mW, possibly also of less than 5 mW at least temporarily, is available. As a result, the (signal) transmission distance that can be bridged by means of such a signal transmission system is regularly limited to a few meters, but in particular less than 20 m.

SUMMARY

Based on the aforementioned prior art, one object of the invention is to improve signal transmission systems of the type in question in such a manner that digital (measurement and/or operating) data can be transmitted at a transmission rate of more than 500 kbit/s over transmission distances of more than 30 m, in particular also more than 50 m, despite an overall low available electrical power of not more than 10 mW or a (transmission) power which can be further reduced temporarily to less than 10 mW.

To achieve the object, the invention consists in a signal transmission system for, for example, ANSI/TIA/EIA-644-1995 (LVDS) compliant digital signal transmission, which signal transmission system comprises:

a transmitter circuit with one signal input and one signal output;
a receiver circuit with a signal input, for example having an input resistance of more than 1 MΩ (MegaOhm), and with a signal output;
as well as a signal cable that is, for example, balanced and/or shielded and/or has a (transmission) length of more than 30 m (meters) and/or is suitable for balanced signal transmission, for example a twisted pair cable, for the electrical connection of transmitter circuit and receiver circuit with at least one pair of signal conductors, for example of the same type and/or having identical electrical properties and/or twisted together, and with at least one terminating resistor R (R=20Ω . . . 500Ω), for example having a resistance value R of more than 20 (Ohm) and less than 0.5 kΩ (kilo ohms), electrically connecting the signal conductors at a receiver circuit-side (respective) line end;
wherein the signal output of the transmitter circuit and the signal input of the receiver circuit are electrically connected to one another by means of the signal cable in such a manner that a current loop involving the signal output of the transmitter circuit, the pair of signal conductors of the signal cable and a current divider formed by means of the terminating resistor and the signal input of the receiver circuit is formed;
and wherein the transmitter circuit is configured to drive a (loop) current with a predeterminable, for example temporarily constant, current intensity and a predeterminable, for example temporarily constant, current direction in the current loop, in such a manner that a (signal) voltage, for example serving as an input voltage of the receiver circuit, drops across the terminating resistor with a voltage level proportional to the current intensity of the (loop) current and a polarity dependent on the current direction of the (loop) current;
wherein the receiver circuit is configured to convert an input voltage, namely a (signal) voltage present at the signal input of the receiver circuit, into a corresponding, for example unipolar, output voltage (ua), namely a (signal) voltage at the signal output of the receiver circuit, in such a manner that said output voltage is (only) at a (positive) input voltage with a (non-zero) voltage, for example not less than +5 mV (millivolts) and exceeding the (positive) first switching voltage threshold value assumes a (positive) first voltage level, for example different from zero and/or not less than +500 mV, or that said output voltage has the first voltage level at an input voltage with a voltage level above the first switching voltage threshold value;
and wherein the receiver circuit has a, for example adjustable, hysteresis, namely a dependence of the output voltage both on the input voltage and on an instantaneous voltage level of the output voltage, in such a manner that an output voltage having the first voltage level, for example with constant polarity of the input voltage, (continues to) have the first voltage level even with an input voltage with a voltage level falling below the first switching voltage threshold value but nevertheless remaining above a (non-zero), for example not more than −5 mV (millivolts), (negative) second switching voltage threshold value;
wherein the transmitter circuit is configured to modulate a digital input signal (e) applied to its signal input, for example with a unipolar voltage and/or a UART-compliant input signal, onto the (loop) current, for example, in such a manner that the (loop) current has a first current direction when the input signal has a first signal state (HIGH) and that the (loop) current has a second current direction opposite to the first current direction when the input signal has a second signal state (LOW) different from the first signal state;
and wherein the transmitter circuit is configured to adjust the current of the (loop) current as a function of the digital input signal at the signal input, in such a manner that the (loop) current is allowed to flow in a first current direction in the current loop when the digital input signal has a first signal state (HIGH), and that the (loop) current (flowing in the first current direction) has or can have at least two consecutively differing (in each case non-zero positive) currents, of which a (positive) first current, for example greater than 1 mA, is greater than a first switching current threshold value, measured as a ratio of the first switching voltage threshold value (of the receiver circuit) to the resistance value of the terminating resistor, and one, for example by more than 0.5 mA, less than the first current, for example more than 0.5 mA, is less than the first switching current threshold value, but greater than a second switching current threshold value measured as a ratio of the second switching voltage threshold value (of the receiver circuit) to the resistance value of the terminating resistor.

The invention further comprises a measuring system, for example an acoustic, vibronic or magnetic-inductive measuring system, for example a vortex flow meter, a Coriolis mass flow meter, an ultrasonic flow meter, a microwave level meter, a pressure meter, a temperature meter, a pH meter, etc.:

- at least one signal transmission system according to the invention;
- a, for example digital, sensor which is configured to detect at least one, for example physical or chemical, measurement variable, for example of a (fluid) measuring substance carried in a (tube) line and/or held in a container, and to convert it into at least one, for example digital, (primary) sensor signal representing the same measurement variable at a signal output;
- and converter electronics, for example having at least one microprocessor and/or at least one application-specific integrated circuit, with a (measurement) signal input and with a data output for digital (user) data;
- wherein the converter electronics are configured to receive and evaluate the at least one sensor signal or a (secondary) signal derived therefrom via the (measurement) signal input, namely to use it to determine the measured values quantifying at least one measurement variable in succession over time,
- and wherein the converter electronics are configured to output digital (useful) data containing the same measured values at the data output.

According to a first embodiment of the invention, it is further provided that the second switching voltage threshold value is below the first switch-on threshold value.

According to a second embodiment of the invention, it is further provided that the first switching voltage threshold value is not less than +5 mV (millivolts), for example greater than +7 mV (millivolts) and/or less than +200 mV (millivolts).

According to a third embodiment of the invention, it is further provided that the second switching voltage threshold value is not greater than −5 mV (millivolts), for example, is not greater than −7 mV (millivolts) and/or is greater than −200 mV (millivolts).

According to a fourth embodiment of the invention, it is further provided that the first and second switching voltage threshold values have the same amount.

According to a fifth embodiment of the invention, it is further provided that the first and second switching voltage threshold values (representing different polarities of the input voltage) have different signs from one another, for example in such a manner that the first threshold value has a positive sign and the second threshold value has a negative sign.

According to a sixth embodiment of the invention, it is further provided that the receiver circuit is configured to convert the input voltage into the output voltage in such a manner that the output voltage assumes a (negative) second voltage level, for example also zero, in the case of a (negative) input voltage with a voltage level below the second switching voltage threshold value, or that the output voltage has the second voltage level in the case of an input voltage with a voltage level below the second switching voltage threshold value. In further embodiment of the invention, the receiver circuit or its hysteresis is further configured such that an output voltage having the second voltage level, for example with constant polarity of the input voltage, also has the second voltage level (further) with an input voltage with a voltage level exceeding the second switching voltage threshold value but remaining below the first switching voltage threshold value. Furthermore, the transmitter circuit can also be configured to adjust the current of the (loop) current depending on the digital input signal at the signal input, in such a manner that the (loop) current flowing in a second current direction opposite to the first current direction also has or can have at least two different (in each case different from zero negative) current strengths in succession, of which a (negative) third current strength, for example less than −1 mA, is smaller than the second switching current threshold value and a fourth current strength, for example more than 0.5 mA more than the third current strength, is greater than the second switching current threshold value but nevertheless smaller than the first switching current threshold value (of the receiver circuit); this, for example, also in such a manner that the transmitter circuit is configured to adjust the third current intensity of the (loop) current (flowing in the second current direction) for a predetermined, for example adjustable, holding time of more than 0.1 μs, for example more than 0.2 μs and/or less than 0.5 μs, and then, for example time-controlled after the predetermined holding time has elapsed, to set the fourth current of the (loop) current (flowing in the second current direction) in each case for a duration of more than 0.5 μs, for example also more than 1 μs, and/or for more than twice, for example more than five times, the duration of the third current and/or to keep it (further) set for as long as the digital input signal has the second signal state.

According to a seventh embodiment of the invention, it is further provided that the transmitter circuit is configured to output an (LVDS) output signal at the signal output, for example conforming to ANSI/TIA/EIA-644-1995 and/or having symmetrical and/or differential voltage levels.

According to an eighth embodiment of the invention, it is further provided that the transmitter circuit is configured to convert a binary input signal supplied via a signal input into an (LVDS) output signal conforming to ANSI/TIA/EIA-644-1995.

According to a ninth embodiment of the invention, it is further provided that the transmitter circuit is configured to adjust the first current intensity of the (loop) current (flowing in the first current direction) for a predetermined, for example also adjustable, holding time of more than 0.1 μs, possibly more than 0.2 μs and/or less than 0.5 μs, and thereafter, for example namely time-controlled after the predetermined holding time has elapsed, to set the second current of the (loop) current (flowing in the first current direction) for a duration of more than 0.5 μs, for example also more than 1 μs, and/or for more than 2 times, for example more than 5 times, the duration of the first current and/or to keep it (further) set for as long as the digital input signal has the first signal state (HIGH).

According to a tenth embodiment of the invention, it is further provided that the transmitter circuit has a (direct) current source, for example with adjustable current intensity, which serves to drive the (loop) current.

According to an eleventh embodiment of the invention, it is further provided that the transmitter circuit is designed as an LVDS driver.

According to a twelfth embodiment of the invention, it is further provided that the receiver circuit is configured to receive at the signal input an (LVDS) input signal, for example conforming to ANSI/TIA/EIA-644-1995 and/or having symmetrical and/or differential voltage levels.

According to a thirteenth embodiment of the invention, it is further provided that the receiver circuit is configured to process an (LVDS) input signal supplied via a signal input, for example conforming to ANSI/TIA/EIA-644-1995 and/or having symmetrical and/or differential voltage levels, for example by converting it into a binary output signal.

According to a fourteenth embodiment of the invention, it is further provided that the receiver circuit is designed as an LVDS receiver.

According to a fifteenth embodiment of the invention, it is further provided that the receiver circuit has a Schmitt trigger serving to configure or adjuster the hysteresis.

According to a sixteenth embodiment of the invention, it is further provided that the receiver circuit has a non-clock-controlled flip-flop (RS flip-flop), for example an asynchronous edge-controlled flip-flop, which serves to configure or adjust the hysteresis.

According to a seventeenth embodiment of the invention, it is further provided that the signal cable is configured to transmit an (LVDS) output signal, for example conforming to ANSI/TIA/EIA-644-1995 and/or having balanced and/or differential voltage levels, at the signal output of the transmitter circuit to the signal input of the receiver circuit.

According to an eighteenth embodiment of the invention, it is further provided that the signal cable has a (transmission) length of more than 30 m (meters), for example more than 50 m.

According to a nineteenth embodiment of the invention, it is further provided that each of the signal conductors of the signal cable has a respective (length) specific ohmic resistance of less than 50 Ω/m.

According to a twentieth embodiment of the invention, it is further provided that the signal cable has a wave impedance (line characteristic impedance) of not less than 20Ω, in particular not more than 500Ω.

According to a twenty-first embodiment of the invention, it is further provided that the signal cable is a twisted pair cable.

According to a further embodiment of the invention, it is further provided that the transmitter circuit comprises a (direct) current source which serves to drive the (loop) current and which can also be controlled, for example.

According to a first embodiment of the measuring system of the invention, it is further provided that the sensor is configured to output a digital sensor signal at the signal output. This embodiment of the invention further provides that the signal input of the transmitter circuit of the signal transmission system is electrically connected to the signal output of the sensor and the signal output of the receiver circuit of the signal transmission system is electrically connected to the (measuring) signal input of the transducer electronics.

According to a first further embodiment of the measuring system of the invention, it is further provided that the measuring system further comprises an (electronic) display element, for example formed by means of a touch display, for example a display and operating element, which is configured to display measured values determined by the converter electronics for the at least one measurement variable.

In addition, the signal input of the transmitter circuit of the signal transmission system can be electrically connected to the data output of the converter electronics and the signal output of the receiver circuit of the signal transmission system can be electrically connected to a data input of the display element.

According to a second further development of the measuring system of the invention, it is further provided that the measuring system further comprises an input/output circuit with a two-wire interface and with a supply output. Furthermore, the input/output circuit can be configured to be integrated into a current loop involving (measuring system external) evaluation and supply electronics by means of the two-wire interface, and the input/output circuit can further be configured to both draw electrical power from the same current loop and to provide electrical power required for operating the measuring system via the supply output. In addition, the converter electronics can also be configured to draw electrical power from the input/output circuit via the supply output and/or the input/output circuit can have a control input connected to the data output of the converter electronics. The control input of the input/output circuit can further be electrically connected to the data output of the converter electronics and the input/output circuit can in turn be configured to set a current strength of an external (loop) current flowing in the two-wire interface as a function of digital (useful) data transmitted to the input/output circuit via the data output, for example depending on measured values contained in the (useful) data and/or in a current strength range between 4 mA and 20 mA and/or by load modulation. This embodiment of the invention is further configured in that the transmitter circuit is configured to adjust an effective value of the (loop) current (flowing in the signal cable) or of an electrical (transmitting) power fed into the signal cable as a function of the measurement variable, for example in such a manner that the effective value of the (loop) current (flowing in the signal cable) and/or an adjustable holding time for the first current intensity and/or the effective value of the electrical (transmitting) power is increased as the measurement variable increases and/or in such a manner that the effective value of the (loop) current (flowing in the signal cable) and/or an adjustable holding time for the first current intensity and/or the effective value of the electrical (transmission) power is reduced as the measurement variable decreases and/or in such a manner that the first current intensity and/or the second current intensity of the (loop) current (flowing in the signal cable) is reduced as the measurement variable decreases. Alternatively or in addition, the transmitter circuit can also be configured to set the first current and/or second current of the (loop) current (flowing in the signal cable) as a function of the current set for the external (loop) current flowing in the two-wire interface, for example, in such a manner that the first current strength and/or the second current strength of the (loop) current (flowing in the signal cable) is increased when the current strength of the external (loop) current increases and/or that the first current strength and/or the second current strength of the (loop) current (flowing in the signal cable) is reduced when the current strength of the external (loop) current decreases.

A basic idea of the invention is to use a hysteresis in the receiver circuit of the signal transmission system—which is ("naturally") inherent in the receiver circuit—or an associated self-holding function established in the receiver circuit, in order to maintain the (loop) current only for a short time at the beginning of each signal transmission cycle, (LVDS) clock cycle of the transmitter circuit started by a signal edge of the digital input signal, the (loop) current is only applied for a short time, for example for approximately 10% to 15% of the respective (LVDS) clock cycle or a (nominal) bit duration, with a high first current, namely more than a switching current threshold value (of the receiver circuit), and then for the remaining clock cycle time until the next signal edge of the digital input signal, not least in order to reduce the electrical power required for this or to save the electrical energy used for this, only with a low second current intensity, i.e., a correspondingly reduced electrical (transmitting) power, which is less than the aforementioned switching current threshold value, without changing the voltage level of the output voltage or a corresponding signal state (HIGH or LOW) of a digital output signal of the receiver circuit formed by the output voltage.

The present disclosure as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the present disclosure that were initially explained only separately, furthermore emerge from the figures of the drawing and/or from the claims themselves.

DETAILED DESCRIPTION

Figure 1:
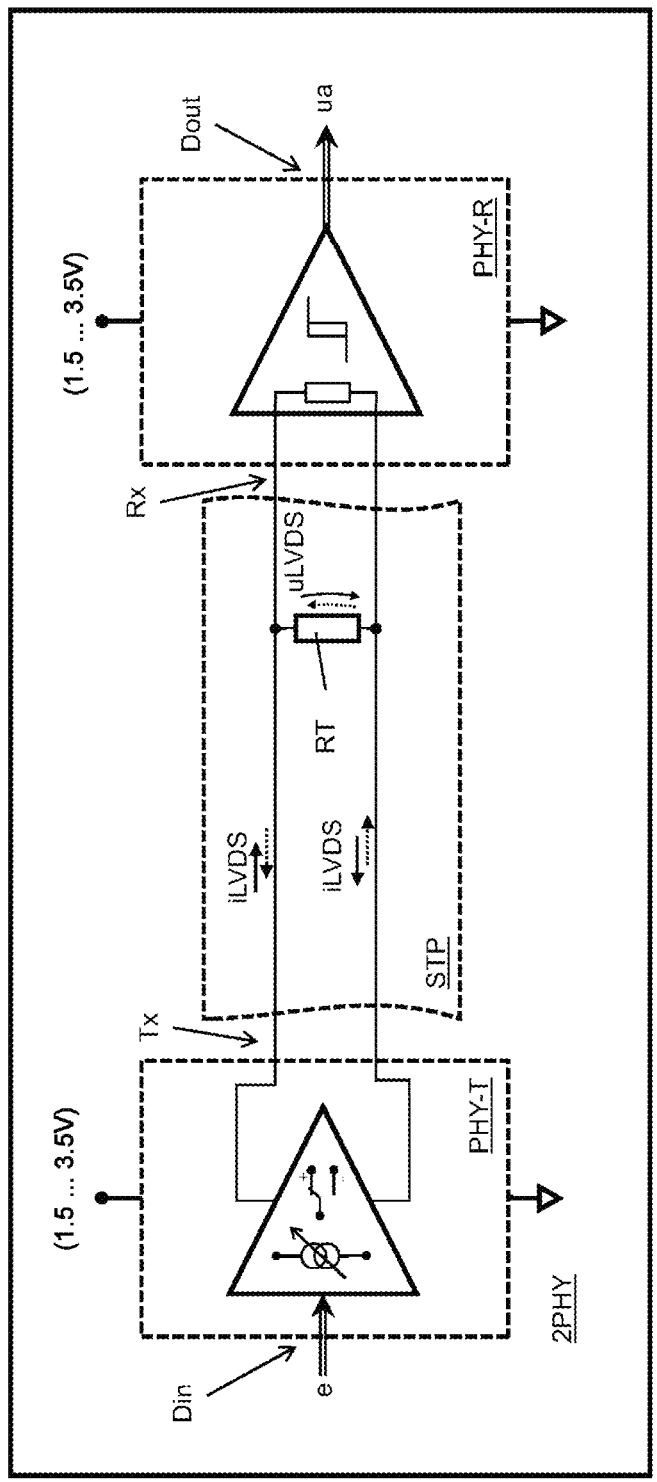
FIG. 1 shows an exemplary embodiment of a signal transmission system according to the present disclosure.

FIG. 1 shows a schematic diagram of an exemplary embodiment of a signal transmission system 2PHY, for example powered by an external source and/or battery, which operates by means of a transmitter circuit PHY-T having a signal input Din and a signal output Tx, for example with an operating voltage of between 1.5 V (volts) and 3.5 V, by means of a signal input Rx and a signal output Dout, and by means of a transmitter circuit PHY-T having a signal input Rx and a signal output Dout, for example also operating with an operating voltage of between 1.5 V and 3.5 V, and by means of a signal cable STP having at least one pair of signal conductors, in particular having similar and/or identical electrical properties and/or twisted together, and at least one terminating resistor RT for the electrical connection of transmitter circuit PHY-T and receiver circuit PHY-R. The signal output Tx of the transmitter circuit PHY-T and the signal input Rx of the receiver circuit PHY-R are also electrically connected to one another by means of the signal cable STP, in such a manner that a current loop involving the signal output Tx, the pair of signal conductors of the signal cable STP and a current divider formed by means of the aforementioned terminating resistor RT electrically connecting the signal conductors at the (respective) end of the line on a receiver circuit PHY-R and the signal input Rx is formed.

According to a further embodiment of the invention, the signal cable is further configured to transmit an (LVDS) output signal, for example also conforming to ANSI/TIA/EIA-644-1995 and/or having balanced and/or differential voltage levels, at the signal output Tx of the transmitter circuit PHY-T to the signal input Rx of the receiver circuit PHY-R. Accordingly, the STP signal cable can also be a symmetrical and/or shielded signal cable or a signal cable suitable for symmetrical signal transmission, for example a twisted pair cable. According to a further embodiment of the invention, the signal cable also has a (transmission) length of more than 30 m (meters), for example also more than 50 m, possibly also more than 100 m, and/or the signal cable has a wave impedance (line characteristic impedance) of not less than 20Ω, in particular also not more than 250Ω. Alternatively or in addition or also for the purpose of realizing the aforementioned wave impedance, each of the signal conductors of the signal cable STP can advantageously have a (length) specific ohmic resistance of less than 50 Ω/m (ohms per meter) and/or the terminating resistor RT can have a resistance value R (R=20Ω . . . 500Ω) of more than 20Ω (ohms), preferably less than 0.5 kΩ (kilo ohms).

According to a further embodiment of the invention, the transmitter circuit PHY-T is configured to output an (LVDS) output signal, for example ANSI/TIA/EIA-644-1995 compliant and/or symmetrical and/or having differential voltage levels, at the signal output Tx and/or the transmitter circuit PHY-T is configured to convert a binary input signal e (e@Din) supplied via signal input Din into an ANSI/TIA/EIA-644-1995 compliant (LVDS) output signal. Alternatively or in addition, according to a further embodiment of the invention, the receiver circuit PHY-R is configured to receive an (LVDS) input signal at the signal input Rx, for example one that conforms to ANSI/TIA/EIA-644-1995 and/or has symmetrical and/or differential voltage levels and/or the receiver circuit PHY-R is configured to process an (LVDS) input signal supplied via signal input Rx, for example one that conforms to ANSI/TIA/EIA-644-1995 and/or has symmetrical and/or differential voltage levels, in particular to convert it into a binary output signal (Ua@Din). Accordingly, the transmitter circuit PHY-T can also be designed as an LVDS driver, for example, or the receiver circuit PHY-R can also be designed as an LVDS receiver, for example.

Figure 2:
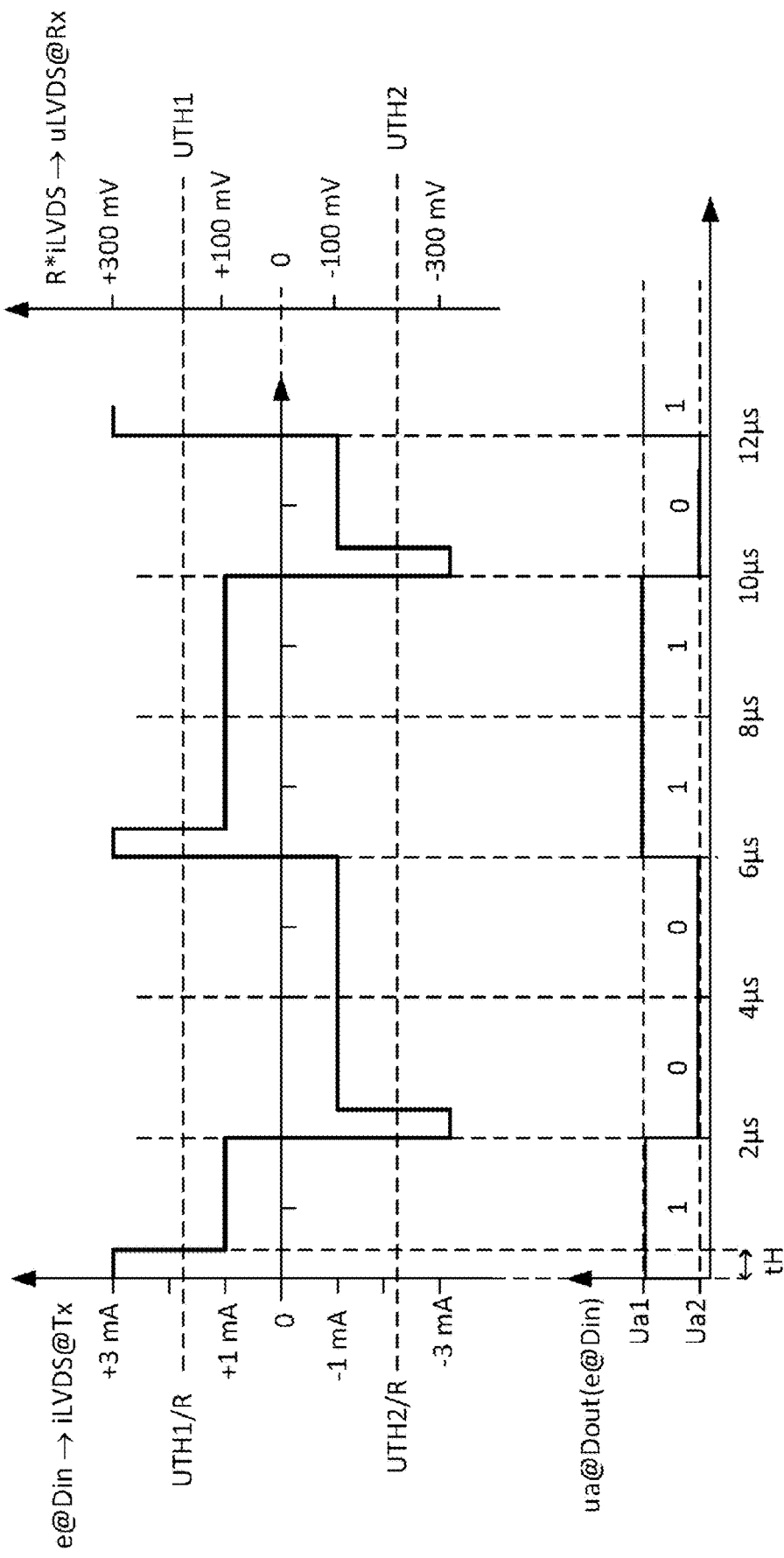
FIG. 2 shows, in various diagrams, time courses of a (loop) current flowing in a signal transmission system in accordance with FIG. 1 and of an output voltage provided by a signal transmission system in accordance with FIG. 1 as a function of the (loop) current.

Accordingly, the transmitter circuit PHY-T of the signal transmission system 2PHY according to the invention is particularly configured to drive a (loop) current iLVDS with a predeterminable current intensity, which is in particular kept constant at times, and a predeterminable current direction (+;−), which is in particular kept constant at times, in the current loop, in such a manner that a (signal) voltage, in particular serving as an input voltage uLVDS of the receiver circuit PHY-R, with a voltage level R*iLVDS proportional to the current of the (loop) current iLVDS and a polarity (+) dependent on the current direction of the (loop) current iLVDS is dropped across the terminating resistor RT (R*iLVDS→uLVDS). In addition, the transmitter circuit PHY-T is configured to modulate a digital input signal e applied to its signal input Din, for example with a unipolar voltage and/or a UART-compliant input signal, onto the (loop) current iLVDS; this in such a manner that the (loop) current iLVDS has a first current direction (+) when the input signal e has a first signal state (HIGH→1) and that the (loop) current iLVDS has a second current direction (−) opposite to the first current direction (+) when the input signal e has a second signal state (LOW→0) different from the first signal state (HIGH). In addition, the receiver circuit PHY-R is configured to convert an input voltage uLVDS, namely a (signal) voltage at the signal input Rx, into a corresponding output voltage ua, namely a (signal) voltage at the signal output Dout that serves as the output signal of the receiver circuit, in such a manner that, as also represented in FIG. 2, the output voltage ua is (only) at a (positive) input voltage uLVDS (uLVDS→+uLVDS) of one (non-zero), for example not less than +5 mV (millivolts), (positive) first switching voltage threshold value UTH1 assumes a (positive) first voltage level UAa1, in particular different from zero and/or not less than +500 mV, or has the first voltage level Ua1 (further) at a voltage level above the said switching voltage threshold value UTH1. Advantageously, the receiver circuit PHY-R can further be configured in such a manner that its switching voltage threshold value UTH1 is not less than +5 mV, for example also greater than +7 mV and/or less than +200 mV (FIG. 2). According to a further embodiment of the invention, the receiver circuit PHY-R is further configured to convert the input voltage uLVDS into the output voltage ua in such a manner that the output voltage ua (only) at a (negative) input voltage uLVDS (uLVDS→−uLVDS) with a voltage level falling below a second switching voltage threshold value UTH2 (different from the first switching voltage threshold value UTH1 as well as from zero) has a voltage level deviating from the first voltage level Ua1 of the output voltage ua, for example zero or also different from zero (negative), second voltage level Ua2 or has a second voltage level Ua2 if the voltage level is below the second switching voltage threshold value UTH2. As also represented in FIG. 2, the second switching voltage threshold value UTH2 can accordingly be below the aforementioned first switching voltage threshold value UTH1 (UTH2<UTH1). Advantageously, the receiver circuit PHY-R can further be configured in such a manner that its switching voltage threshold value UTH2 is not more than −5 mV, for example less than −7 mV and/or greater than −200 mV. According to a further embodiment of the invention, the receiver circuit PHY-R is configured in such a manner that the first and second switching voltage threshold values UTH1, UTH2, as also represented in FIG. 2, have different signs (representing different polarities of the input voltage uLVDS) from one another, for example, in such a manner that the first switching voltage threshold value UTH1 has a positive sign (+) and the second switching voltage threshold value UTH2 has a negative sign (−), thus the switching voltage threshold value UTH1 is accordingly above zero and the switching voltage threshold value UTH2 is accordingly below zero (UTH2<0<UTH1), in particular in such a manner that the first and second switching voltage threshold values UTH1, UTH2 have an equal amount (|UTH1|=|UTH2|). According to a further embodiment of the invention, the signal input Rx of the receiver circuit PHY-R has an input resistance of more than 1 MΩ (mega ohms), not least in order to allow as low a (partial) current as possible to flow through the signal input Rx during operation compared to a (partial) current flowing through the terminating resistor RT.

To drive the (loop) current iLVDS, the transmitter circuit PHY-T has, according to a further embodiment, a (direct) current source, in particular a controllable one. The current source can also be configured, for example, to drive the (loop) current iLVDS with at least four different current levels, in particular in such a manner that a first current strength is greater than 1 mA and/or less than 5 mA and a second current strength is more than 0.5 mA less than the first current strength and/or that a third current strength is less than −1 mA and/or greater than −5 mA and a fourth current strength is more than 0.5 mA greater than the third current strength, and/or to drive the (loop) current at times with a first current direction (+) or at times with a second current direction (−) opposite to the first current direction.

The receiver circuit PHY-R of the signal transmission system 2PHY according to the invention further has a hysteresis, which may also be adjustable, namely a dependence of the output voltage ua both on the input voltage uLVDS and on an instantaneous voltage level (Ua1; Ua2) of the output voltage ua, in such a manner that an output voltage ua having the first voltage level Ua1, in particular with constant polarity of the input voltage uLVDS, (continues to) assume the first voltage level Ua1 even with an input voltage uLVDS with a voltage level falling below the first switching voltage threshold value UTH1 but remaining above the (negative) second switching voltage threshold value UTH2. Furthermore, the transmitter circuit PHY-T is configured to set the current intensity of the (loop) current iLVDS as a function of the digital input signal e at the signal input Din, in such a manner that (loop) current iLVDS is allowed to flow in a first current direction (+) in the current loop (iLVDS→+iLVDS) when the digital input signal e has a first signal state (HIGH→1). Utilizing the aforementioned hysteresis of the receiver circuit PHY-R, the transmitter circuit PHY-T is also configured to adjust the current strength of the (loop) current iLVDS as a function of the digital input signal e at the signal input Din in such a manner that the (loop) current iLVDS (flowing in the first current direction) has or can have at least two consecutively differing current strengths (each different from zero). Of said currents of the (loop) current iLVDS, a (positive) first current, for example greater than 1 mA, is greater (set) than a first switching current threshold value UTH1/R (of the receiver circuit PHY-R), measured as a ratio of the first switching voltage threshold value UTH1 (of the receiver circuit PHY-R) to the resistance value R of the terminating resistor RT, and a (positive) second current less than the first current, for example more than 0.5 mA, is smaller (set) than the first switching current threshold value UTH1/R but greater than a second switching current threshold value UTH2/R (of the receiver circuit PHY-R), measured as a ratio of the second switching voltage threshold value UTH2 (of the receiver circuit) to the resistance value R of the terminating resistor RT. According to a further embodiment of the invention, transmitter circuit PHY-T is further configured to adjust the aforementioned first current intensity in each case for a predetermined holding time tH of more than 0.1 μs, in particular more than 0.2 μs and/or less than 0.5 μs, for example also adjustable or variable during operation, and then, for example namely time-controlled after the predetermined holding time tH has expired, to adjust the second current intensity in each case for a duration of more than 0.5 μs, in particular more than 1 μs, and/or for more than 2 times, in particular more than 5 times, the duration of the first current and/or to (only) continue to be set for as long as the digital input signal e has the first signal state (HIGH) (FIG. 2).

According to a further embodiment of the invention, the receiver circuit PHY-R or its hysteresis is furthermore also configured such that an output voltage ua having the second voltage level Ua2, in particular if the polarity of the input voltage uLVDS remains constant, (continues to) assume the second voltage level Ua2 even if the input voltage uLVDS has a voltage level which rises above the second switch-on voltage threshold value UTH2 but nevertheless remains below the first switching voltage threshold value UTH1. Accordingly, the transmitter circuit PHY-T is advantageously further configured to adjust the current of the (loop) current iLVDS as a function of the digital input signal at the signal input Din in such a manner, that the (loop) current iLVDS flowing in a second current direction opposite to the first current direction also has or can have at least two different (in each case non-zero negative) currents in succession, of which a (negative) third current, for example less than −1 mA, is less than the second switching current threshold value UTH2/R and a fourth current, in particular more than 0.5 mA greater than the third current, is greater than the second switching current threshold value UTH2/R but less than the first switching current threshold value UTH1/R. Further, the transmitter circuit PHY-T can also be configured to adjust the third current of the (loop) current (iLVDS) (flowing in the second current direction) for a predetermined hold time (tH) of more than 0.1 µs, in particular for more than 0.2 µs and/or less than 0.5 µs, and thereafter, in particular time-controlled after the predetermined holding time has elapsed, the fourth current of the (loop) current (iLVDS) (flowing in the second current direction) is set for a duration of more than 0.5 µs, in particular more than 1 µs, and/or for more than 2 times, in particular more than 5 times, the duration of the third current and/or is held (further) set for as long as the digital input signal e has the second signal state (LOW).

Figure 3:
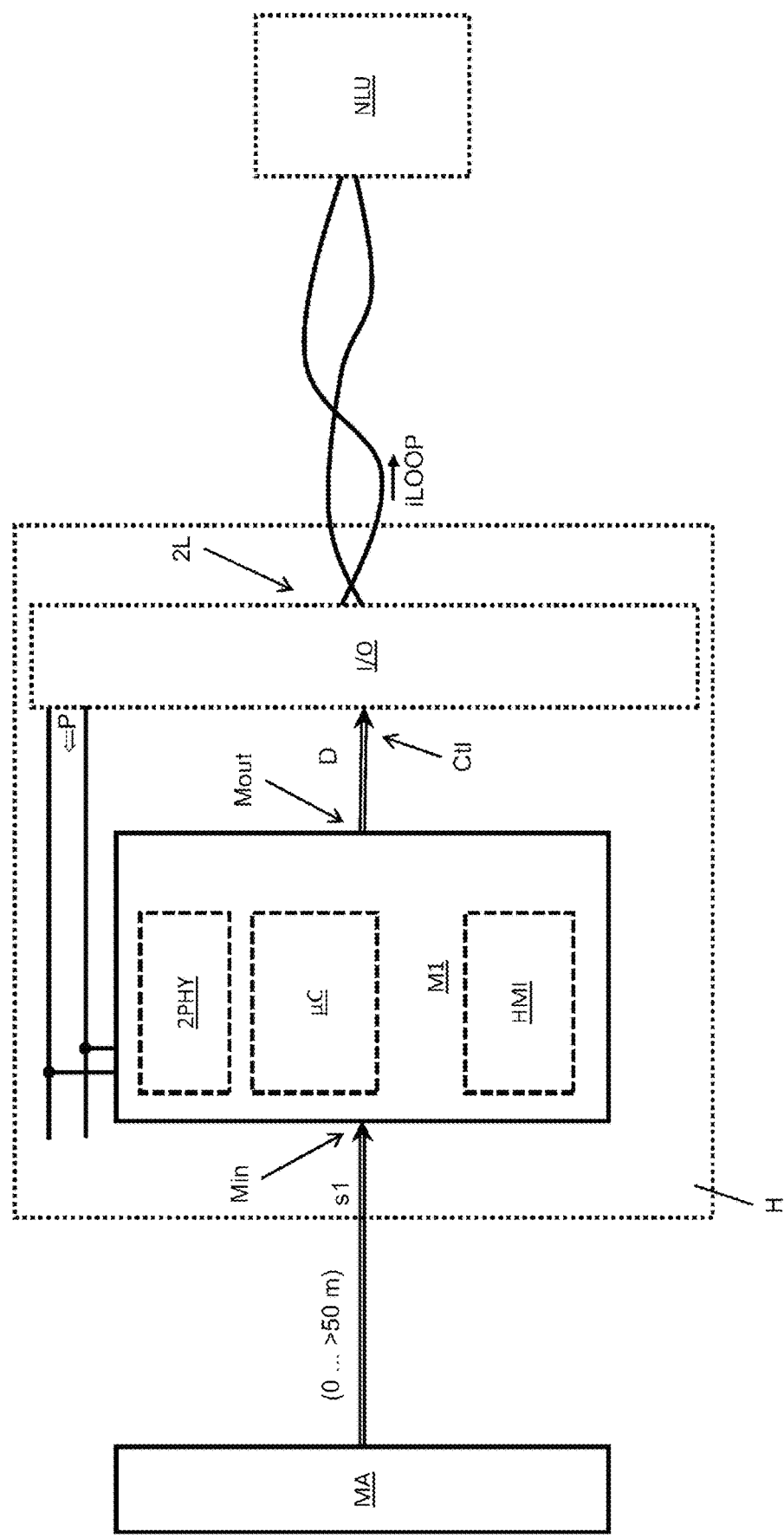
FIG. 3 shows an exemplary embodiment of a measuring system formed by means of a signal transmission system in accordance with FIG. 1.

The signal transmission system 2PHY can, as already mentioned or schematically represented in FIG. 3, particularly also be a component of a measuring system—for example, a measuring and/or switching device of industrial measurement and automation technology—with, for example, at least one microprocessor (µC) and/or having at least one application-specific integrated circuit (ASIC), converter electronics M1 and with a sensor MA, for example a digital sensor, for example an acoustic, vibronic or magnetic-inductive (flow) sensor, electrically coupled to the converter electronics M1. The same sensor MA can in turn be configured in particular to detect at least one (physical or chemical) measurement variable, for example of a (fluid) measuring substance carried in a (tube) line and/or held in a container, and to generate at least one signal representing the same measurement variable, possibly also to supply a digital (primary) sensor signal s1, in particular to convert the (detected) measurement variable into the at least one (primary) sensor signal s1 at a (sensor) signal output or to provide the (primary) sensor signal s1 at the (sensor) signal output for further processing in the measuring system. In accordance with one embodiment of the invention, the converter electronics M1 further has a (measurement) signal input Min and a data output Mout for digital (useful) data D. In addition, the converter electronics M1 can also be configured to receive and evaluate the at least one sensor signal s1 or a (secondary) signal derived therefrom via the aforementioned (measurement) signal input, namely to use the sensor signal s1 or the (secondary) signal to determine the at least one measurement variable in succession, possibly also digital measurement values, for example also to output digital (useful) data containing the measurement values at the aforementioned data output. According to a further configuration, the measuring system also has an (electronic) display element HMI, for example formed by means of a touch display, for example namely a display and operating element, which is configured to display measured values determined by the converter electronics M1 for the at least one measurement variable. In this case, the signal input Din of the transmitter circuit PHY-T can also be electrically connected directly to the data output Mout of the converter electronics M1 and the signal output Dout of the receiver circuit PHY-R can be electrically connected to a data input of the display element HMI. For the other case described above, in which the sensor MA is configured to output the sensor signal s1 as a digital sensor signal at the signal output, the signal input Din of the transmitter circuit of the signal transmission system 2PHY (or of a further signal transmission system of the measuring system) can, for example, also be connected (directly) to the signal output of the sensor MA and the signal output Dout of the receiver circuit of the same signal transmission system to the (measuring) signal input of the transducer electronics M1. In addition, the converter electronics M1 can be arranged inside a protective housing H, as is quite common in such measuring systems or as also shown schematically in FIG. 3. Alternatively or in addition, the aforementioned measuring system can also be part of an (industrial) communication system, for example, which includes an (external or remote) measuring system, possibly also has evaluation and supply electronics NLU arranged at a distance from the Umfomer electronics M1 or the measuring system formed therewith, which in turn is electrically connected to the Umfomer electronics M1, in particular is coupled to its data output Mout by means of signals, for example via field bus and/or by radio. The evaluation and supply electronics NLU can be, for example, a remote I/O, a programmable logic controller (PLC), a bus master in a field bus, for example in accordance with the industry standard IEC 61158:1999, in particular in accordance with one of the families CPF1 (FOUNDATION FIELDBUS), CPF3 (PROFIBUS), CPF9 (HART) or CPF15 (MODBUS), a gateway, a mobile (edge) computer or also a radio module or a radio adapter, for example in accordance with IEEE 802.15.4:2007 (WirelessHART), wherein the evaluation and supply electronics NLU itself can be mains and/or battery powered, for example.

According to a further embodiment of the invention, the aforementioned measuring system also has an input/output circuit I/O with a two-wire interface 2L and with a supply output EV. The input/output circuit I/O is in particular intended or configured to be integrated by means of the two-wire interface 2L into a current loop also involving the (measuring system external) evaluation and supply electronics NLU. In addition, the input/output circuit I/O can advantageously also be configured to draw electrical power from the same current loop as well as to provide electrical power (P) via the supply output required for the operation of the measuring system, not least also of the signal transmission system 2PHY, or the converter electronics M1 can further be configured accordingly to draw electrical power P via the supply output from the input/output circuit I/O. According to a further embodiment of the invention, the input/output circuit I/O further has a control input Ctl connected (electrically or by signal) to the data output Mout of the converter electronics M1, and the input/output circuit I/O is also configured to adjust a current of an external electrical (loop) current iLOOP flowing in the two-wire interface 2L in dependence on digital (useful) data D transmitted to the input/output circuit I/O via data output Mout, for example on measured values contained in the (useful) data. In particular, the input/output circuit I/O can accordingly also be configured to vary the external (loop) current iLOOP (driven by the evaluation and supply electronics NLU) between 4 mA and 20 mA by (load) modulation or by adjusting its current intensity as a function of the aforementioned measured values, meaning that the external (loop) current iLOOP can be configured as an external current, for example in accordance with DIN IEC 60381-1:1985-1 1, in particular as a (4-20 mA) current signal. Not least for the purpose of adapting the power requirement of the signal transmission system 2PHY or the converter electronics M1 formed with it to the electrical power P currently provided via the input/output circuit I/O, the transmitter circuit PHY-T can further be configured to adjust an effective value of the (loop) current iLVDS or of an electrical (transmission) power fed into the signal cable STP as a function of the measurement variable or as a function of the current of the external (loop) current iLOOP flowing in the two-wire interface 2L, for example, in such a manner that the effective value of the (loop) current iLVDS or the electrical (transmission) power is increased when the measurement variable increases or the current of the external (loop) current iLOOP increases or, conversely, is reduced accordingly when the measurement variable decreases or the current of the external (loop) current iLOOP decreases. Alternatively or in addition, the transmitter circuit PHY-T can also be configured to set the first current intensity and/or the second current intensity of the (loop) current iLVDS as a function of the measurement variable or the current intensity set for the external (loop) current iLOOP flowing in the two-wire interface 2L, for example, in such a manner that the first current and/or the second current of the (loop) current iLVDS is increased when the measurement variable increases or when the current of the external (loop) current iLOOP increases or, conversely, is reduced accordingly when the measurement variable decreases or the current of the external (loop) current iLOOP decreases. In the above-mentioned case that the transmitter circuit PHY-T is configured to adjust the first current intensity for an adjustable or variable holding time tH during operation, the transmitter circuit PHY-T can also be configured to vary the effective value of the (loop) current iLVDS or the electrical (transmission) power fed into the signal cable STP accordingly by setting the holding time tH as a function of the measurement variable or as a function of the current set for the electrical (loop) current iLOOP flowing in the two-wire interface 2L, for example, in such a manner that the holding time th is increased accordingly when the measurement variable increases or when the current of the (loop) current iLOOP increases or, conversely, is reduced accordingly when the measurement variable decreases or when the current of the (loop) current iLOOP decreases. The signal transmission system 2PHY (or further signal transmission system according to the invention) can subsequently also be used for the (signal-related) connection of converter electronics M1 and input/output circuit I/O, for example in such a manner that the data output D of the converter electronics M1 is connected to the signal input Din of the transmitter circuit PHY-T and the signal output Dout of the receiver circuit PHY-R is connected to the control input Ctl of the input/output circuit I/O.

The invention claimed is:

1. A signal transmission system for digital signal transmission, comprising:
    a transmitter circuit with a signal input and with a signal output;
    a receiver circuit with a signal input and with a signal output; and
    a signal cable for the electrical connection of the transmitter circuit and the receiver circuit, the signal cable having a pair of signal conductors and a terminating resistor electrically connecting the signal conductors at a receiver circuit side respective line end;
    wherein the signal output of the transmitter circuit and the signal input of the receiver circuit are electrically connected to one another by means of the signal cable such that a current loop involving the signal output of the transmitter circuit, the pair of signal conductors of the signal cable, and a current divider formed by the terminating resistor and the signal input of the receiver circuit is formed;
    wherein the transmitter circuit is configured to drive a loop current with a current magnitude and a predeterminable current direction in the current loop such that a signal voltage proportional to the magnitude of the loop current and a polarity dependent on the current direction of the loop current drops over the terminating resistor;
    wherein the receiver circuit is configured to convert an input voltage into a corresponding output voltage such that, when the input voltage exceeds a positive first switching voltage threshold, the output voltage assumes a positive first voltage level and that when the input voltage exceeds the positive first switching voltage threshold, the output voltage holds the first voltage level, respectively;
    wherein the receiver circuit has an hysteresis, namely a dependence of the output voltage both on the input voltage and on an instantaneous voltage level of the output voltage, such that the output voltage which has the first voltage level further holds the first voltage level even if the input voltage falls below the first switching voltage threshold but nevertheless remains above a second switching voltage threshold that is non-zero;
    wherein the transmitter circuit is configured to modulate a digital input signal present at its signal input onto the loop current; and
    wherein the transmitter circuit is configured to adjust the current of the loop current as a function of the digital input signal at the signal input such that the loop current is allowed to flow in a first current direction in the current loop when the digital input signal has a first signal state and that the loop current flowing in the first current direction has or can have at least two successively differing in each case non-zero positive currents, of which a positive first current magnitude is greater than a first switching current threshold, defined as a ratio of the first switching voltage threshold of the receiver circuit to the resistance value of the terminating resistor, and a second current magnitude less than the first switching current threshold but greater than a second switching current threshold, defined as a ratio of the second switching voltage threshold of the receiver circuit to the resistance value of the terminating resistor.

2. The signal transmission system according to claim 1,
    wherein the second switching voltage threshold is below the first switching voltage threshold; and/or
    wherein the first switching voltage threshold is not less than +5 mV (millivolts); and/or
    wherein the second switching voltage threshold is not greater than −5 mV (millivolts) and/or
    wherein the first and second switching voltage thresholds have the same magnitude; and/or
    wherein the first and second switching voltage thresholds representing different polarities of the input voltage have different signs from one another.

3. The signal transmission system according claim 1, wherein the transmitter circuit is configured to adjust the first current of the loop current flowing in the first current direction for a predetermined hold time of more than 0.1 μs and thereafter to set the second current of the loop current flowing in the first current direction for a duration of more than 0.5 μs, and/or for more than twice the duration of the first current and/or to keep it further set for as long as the digital input signal has the first signal state.

4. The signal transmission system according to claim 1, wherein the receiver circuit is configured to convert the input voltage into the output voltage such that the output voltage assumes a negative second voltage level at a negative input voltage with a voltage level falling below the second switching voltage threshold or that the output voltage has the second voltage level at an input voltage with a voltage level below the second switching voltage threshold.

5. The signal transmission system according to claim 4, wherein the receiver circuit or its hysteresis is configured in such a manner that an output voltage having the second voltage level further with an input voltage with a voltage level exceeding the second switching voltage threshold but remaining below the first switching voltage threshold.

6. The signal transmission system according to claim 5, wherein the transmitter circuit is configured to set the magnitude of the loop current as a function of the digital input signal at the signal input in such a manner that the loop current flowing in a second current direction opposite to the first current direction also has or can have at least two current magnitudes each different from zero negative which differ from one another in time sequence and of which a negative third current is less than the second switching current threshold and a fourth current is greater than the second switching current threshold but less than the first switching current threshold of the receiver circuit.

7. The signal transmission system according to claim 6, wherein the transmitting circuit is configured:
to adjust the third current of the loop current flowing in the second current direction for a predetermined hold time of more than 0.1 μs; and
to set the fourth current of the loop current flowing in the second current direction for a duration of more than 0.5 μs, and/or to keep it further set for as long as the digital input signal has the second signal state.

8. The signal transmission system according to claim 1, wherein the transmitter circuit is configured to output an output signal at the signal output that conforms to ANSI/TIA/EIA-644-1995 and/or has symmetrical and/ or differential voltage levels; and/or
wherein the transmitter circuit is configured to convert a binary input signal supplied via the signal input into an output signal conforming to ANSI/TIA/EIA-644-1995; and/or
wherein the transmitter circuit has an adjustable direct current source for driving the loop current; and/or
wherein the transmitter circuit is designed as an LVDS driver; and/or
wherein the receiver circuit is configured to receive an input signal at the signal input; and/or
wherein the receiver circuit is configured to process an input signal supplied via the signal input; and/or
wherein the receiver circuit is designed as an LVDS receiver; and/or
wherein the receiver circuit has a Schmitt trigger for configuring or adjusting the hysteresis; and/or
wherein the receiver circuit has a non-clock-controlled flip-flop which serves to configure or adjust the hysteresis; and/or
wherein the signal cable is configured to transmit an output signal at the signal output of the transmitter circuit to the signal input of the receiver circuit; and
wherein the signal cable has a transmission length of more than 30 m; and/or
wherein each of the signal conductors of the signal cable has a length-specific ohmic resistance of less than 50 Ω/m; and/or
wherein the signal cable has a wave impedance of not less than 20Ω; and/or
wherein the signal cable is a twisted pair cable.

9. The signal transmission system according to claim 1, wherein the transmitter circuit comprises a current source serving to drive the loop current.

10. A measuring system comprising:
a signal transmission system for digital signal transmission, including:
a transmitter circuit with a signal input and with a signal output;
a receiver circuit with a signal input and with a signal output; and
a signal cable for the electrical connection of the transmitter circuit and the receiver circuit, the signal cable having a pair of signal conductors and a terminating resistor electrically connecting the signal conductors at a receiver circuit side respective line end;
wherein the signal output of the transmitter circuit and the signal input of the receiver circuit are electrically connected to one another by means of the signal cable such that a current loop involving the signal output of the transmitter circuit, the pair of signal conductors of the signal cable, and a current divider formed by the terminating resistor and the signal input of the receiver circuit is formed;
wherein the transmitter circuit is configured to drive a loop current with a current magnitude and a predeterminable current direction in the current loop such that a signal voltage proportional to the magnitude of the loop current and a polarity dependent on the current direction of the loop current drops over the terminating resistor;
wherein the receiver circuit is configured to convert an input voltage into a corresponding output voltage such that, when the input voltage exceeds a positive first switching voltage threshold, the output voltage assumes a positive first voltage level and that when the input voltage exceeds the positive first switching voltage threshold, the output voltage holds the first voltage level, respectively;
wherein the receiver circuit has an hysteresis, namely a dependence of the output voltage both on the input voltage and on an instantaneous voltage level of the output voltage, such that the output voltage which has the first voltage level further holds the first voltage level even if the input voltage falls below the first switching voltage threshold but nevertheless remains above a second switching voltage threshold that is non-zero;
wherein the transmitter circuit is configured to modulate a digital input signal present at its signal input onto the loop current; and
wherein the transmitter circuit is configured to adjust the current of the loop current as a function of the digital input signal at the signal input such that the loop current is allowed to flow in a first current direction in the current loop when the digital input signal has a first signal state and that the loop current flowing in the first current direction has or can have at least two successively differing in each case non-zero positive currents, of which a positive first current magnitude is greater than a first switching current threshold, defined as a ratio of the first switching voltage threshold of the receiver circuit to the resistance value of the terminating resistor, and a second current magnitude less than the first switching current threshold but greater than a second switching current threshold, defined as a ratio of the second switching voltage threshold of the receiver circuit to the resistance value of the terminating resistor;

a sensor which is configured to detect at least one measurement variable and to convert the at least one measurement variable into at least one, primary sensor signal representing the same measurement variable at a signal output; and a converter electronics-with a measurement signal input and with a data output for digital user data;

wherein the converter electronics are configured to receive and evaluate the at least one sensor signal or a secondary signal derived therefrom via the measurement signal input, and wherein the converter electronics are configured to output digital useful data containing the same measured values at the data output.

11. The measuring system according to claim 10, wherein the sensor is configured to output a digital sensor signal at the signal output.

12. The measuring system according to claim 11, wherein the signal input of the transmitter circuit of the signal transmission system is electrically connected to the signal output of the sensor and the signal output of the receiver circuit of the signal transmission system is electrically connected to the measuring signal input of the transducer electronics.

13. The measuring system according to claim 11, further comprising:

an electronic display element, wherein the signal input of the transmitter circuit of the signal transmission system is electrically connected to the data output of the converter electronics and the signal output of the receiver circuit of the signal transmission system is electrically connected to a data input of the display element.

14. The measuring system according to claim 13, further comprising:

an input/output circuit with a two-wire interface and with a supply output, wherein the input/output circuit is configured, via the two-wire interface, to be integrated into a current loop involving measuring system external evaluation and supply electronics, and wherein the input/output circuit is configured both to draw electrical power from the same current loop and to provide electrical power via supply output required for the operation of the measuring system.

15. The measuring system according to claim 14, wherein the input/output circuit has a control input connected to the data output of the converter electronics, wherein the control input of the input/output circuit is electrically connected to the data output of the converter electronics, and wherein the input/output circuit is configured to adjust a current magnitude of an external loop current flowing in the two-wire interface in dependence on digital useful data transmitted via data output to the input/output circuit.

16. The measuring system according to claim 15, wherein the transmitter circuit is configured to adjust an effective value of the loop current or of an electrical transmission power fed into the signal cable as a function of the measurement variable, in particular in such a manner that the RMS value of the loop current and/or the RMS value of the electrical transmit power is increased when the measurement variable increases and/or in such a manner that the RMS value of the loop current and/or the RMS value of the electrical transmit power is decreased when the measurement variable decreases and/or in such a manner that the first current intensity and/or the second current intensity of the loop current is decreased when the measurement variable decreases; and/or wherein the transmitter circuit is configured to set the first current intensity and/or second current intensity of the (loop) current as a function of the current intensity set for the external loop current flowing in the two-wire interface, in such a manner, in particular, that the first current and/or the second current of the loop current is increased when the current of the external loop current increases and/or that the first current and/or the second current of the loop current is reduced when the current of the external loop current decreases.

17. The measuring system according to claim 16, wherein the transmitter circuit is configured to adjust the first current of the loop current flowing in the first current direction for a predetermined hold time of more than 0.1 µs and thereafter to set the second current of the loop current flowing in the first current direction for a duration of more than 0.5 µs, and/or for more than twice the duration of the first current and/or to keep it further set for as long as the digital input signal has the first signal state, wherein the transmitter circuit is configured to adjust the holding time tH for the first current as a function of the measurement variable, and/or wherein the transmitter circuit is configured to adjust the holding time for the first current as a function of the current set for the external loop current flowing in the two-wire interface.

18. The measuring system according to claim 13, wherein the converter electronics is configured to obtain electrical power via the supply output from the input/output circuit.

* * * * *